United States Patent [19]
Cheung

[11] 3,958,516
[45] May 25, 1976

[54] LOAD ANCHOR MEANS
[75] Inventor: Nelson Cheung, Arlington Heights, Ill.
[73] Assignee: Signode Corporation, Glenview, Ill.
[22] Filed: Dec. 20, 1974
[21] Appl. No.: 535,036

[52] U.S. Cl. .............................. 105/478; 105/483
[51] Int. Cl.² ................................. B61D 45/00
[58] Field of Search ........... 105/466, 469, 473, 475, 105/476, 477, 478–481, 483–485; 24/265 R, 265 CD; 248/499, 222, 295, 298

[56] References Cited
UNITED STATES PATENTS

| | | | |
|---|---|---|---|
| 2,984,885 | 5/1961 | Elsner | 105/483 X |
| 3,017,679 | 1/1962 | Elsner | 105/483 X |
| 3,405,660 | 10/1968 | Jantzen | 105/481 |

Primary Examiner—M. H. Wood, Jr.
Assistant Examiner—Gene A. Church
Attorney, Agent, or Firm—Dressler, Goldsmith, Clement & Gordon

[57] ABSTRACT

The load anchors illustrated and described herein are for anchoring straps in place relative to a support track. The load anchors comprise a pair of rigid load anchor plates, each plate having a notch in each transverse edge thereof. The notches define a neck portion which separates a head portion and a base portion. An aperture extends through the base portion, with the distance between the geographic center of the aperture to the deepest point of one notch exceeding the distance between the center of the aperture to the deepest point of the other notch. The apertures in both load anchor plates are not aligned when the notches in the plates are aligned; however, the anchor plates can be moved with respect to one another so as to place the apertures thereof in registry with each other and to enable a strap to pass therethrough.

15 Claims, 6 Drawing Figures

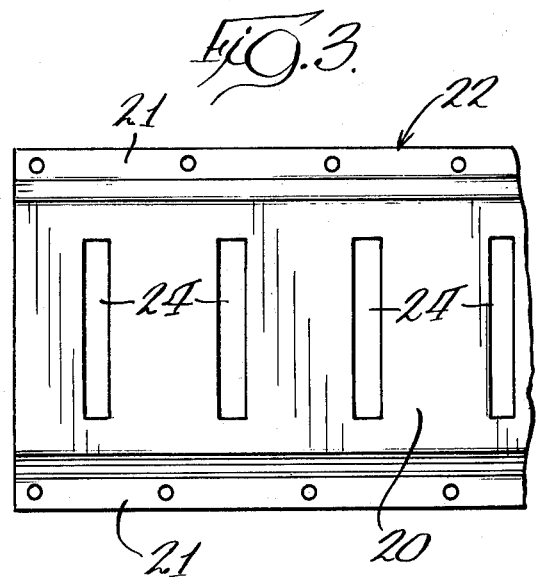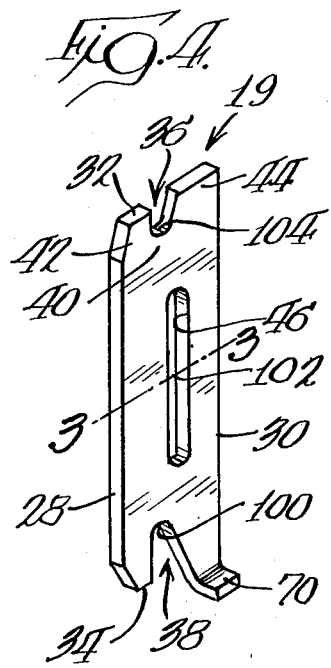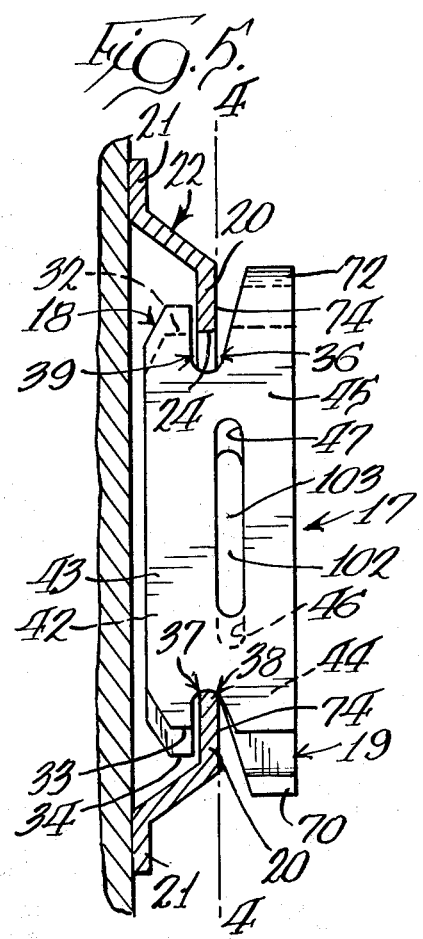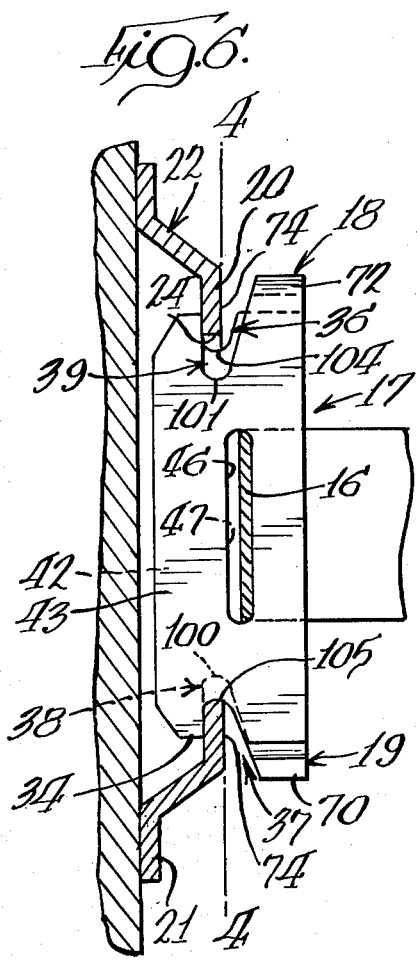

LOAD ANCHOR MEANS

BACKGROUND OF THE INVENTION

Loads carried in trailers and cargo containers must be secured in place relative thereto to prevent or minimize movement of the loads relative to the containers. This is obviously necessary to eliminate damage to the loads that could be caused by repeated shifting and resulting collisions of the loads with adjacent loads, or by banging against walls. With the advent of substantially all-metal trailers and cargo containers, it is necessary to provide load anchors that can be positively and securely located in position without necessitating the use of nails, or other fasteners. Such conventional fasteners performed effectively to anchor straps that were used to retain loads in position in conventional freight cars, since they could be driven into the wooden studs spaced along the sidewalls of such conventional freight cars provided with same. In the case of metal containers, where wooden supports are not present, anchors employing nails, or the like, cannot be used, thus requiring load anchors that can be inserted and secured in position relative to the support tracks welded to the car walls without requiring separate fasteners to retain them in place.

In conventional freight cars having wooden supports, anchor and snubber plates have been used to secure the straps employed for holding the loads in position in the car. The plates are secured to the floor, or sidewalls of the car by nails, or other suitable fastening means. Several types of these are disclosed in U.S. Pat. No. 1,920,195 to Scales, and U.S. Pat. No. 2,458,287 to Moon. Another type of strap connector that has been used is a cushion-type seal, such as disclosed in U.S. Pat. No. 3,653,334 to Meier. All of these patents are assigned to the assignee of the present invention. These patents discuss in some detail the problems encountered in carrying loads that tend to shift in freight cars which is similar to that of trailers and cargo containers, and if more specific information with respect thereto is desired, reference should be made to these three patents.

It can be appreciated that the aforementioned types of connectors cannot be used in metal cars lacking wooden supports, since there is no structure in the car to which the connector can be connected. Currently, in order to retain the loads against shifting in metal trailers and cargo containers, webbed belting has been used to secure the commodities. The belting and securement fasteners disclosed in U.S. Pat. Nos. 3,608,159 to Brucker and 3,323,186 to Rennert are relatively expensive when compared to the low cost disposable strapping and load anchors of this invention. The fastener disclosed in the Rennert patent requires a spring-loaded latch, and the fastener in the Brucker patent requires a wire keeper member which coacts with a notch within a notch, with the outer notch having an inclined inner surface so that the wire keeper member will slide into the inner notch and form a part of the outer notch wall.

The present invention, on the other hand, provides a relatively simple and inexpensive load anchoring means which obviates the drawbacks of the aforesaid prior art devices.

SUMMARY OF THE INVENTION

In accordance with the present invention, there are provided load anchors that permit the utilization of tensioned straps or the like for securing loads in position in a freight car or similar freight transport device which is provided with a plurality of supporting members, or tracks, having spaced, oblong holes therein. The load anchors of this invention can be used with metal or plastic strap, rope, plastic cord, woven belts or other flexible materials. For convenience, the material utilized to secure loads in position through use of the load anchors of this invention will hereinafter be referred to as strap.

The load anchors are designed to anchor straps to the supporting members of the trailers or cargo containers in a quick and efficient manner. The load anchors are installed in place by suitable manipulation of the component parts thereof relative to the supporting members and do not require nails, or other fasteners to hold them in place. Straps are secured to the load anchors after they are installed. The interrelationship between the load anchors and the supporting members is such that when the strap is connected to the load anchors, the load anchors cannot be removed from the supporting members. However, once the straps serving to retain the loads in position have been removed from the load anchors, the load anchors can be readily removed from the trailer, or the like. The load anchors and strapping are relatively inexpensive and expendable, which results in appreciable saving over the high cost of equipment now used.

Each load anchor is adapted to be received within an opening in a track mounted on a wall of a cargo container or a trailer and to engage the track when a strap is passed through the load anchor. Each load anchor comprises a pair of rigid, substantially identical but asymmetric anchor plates which are constructed and arranged to enable the strap to pass through an aperture in each plate, the alignment of the apertures in registry with one another resulting in a non-alignment of the anchor plates such that the load anchor cannot be removed from the track when the strap extends through the apertures. However, once the strap is pulled out of the apertures, the load anchor can be readily removed. The strap thus serves to align the apertures in the anchor plates which co-act to form a load anchor, each plate locking the load anchor in place while the strap extends therethrough.

Each plate of the load anchor of the present invention is provided with a pair of lateral and transverse edges, with the transverse edges of each plate having a notch. The notches define a neck portion which separates a head portion and a base portion. The distance between the deepest point of the deeper notch and the opposite end of the head portion is less than the length of the oblong opening in the track, thereby enabling the head portion of each anchor plate to be inserted into the opening in the track. The other notch has a shallower depth and determines the distance which the anchor plate can potentially be displaced without disengaging the deepest notch while inserted in an opening in the track.

The base portion of the anchor plate has an aperture extending therethrough, which is adapted to receive a strap. The aperture may be oblong or substantially rectangular to accommodate a strap, cylindrical to accommodate a rope or cord, or some other shape to enable a correspondingly shaped tying material to snugly extend therethrough.

The configuration of each anchor plate is such that the distance between the geographic center of the aperture to the deepest point of one notch is greater than the distance between the geographic center of the aperture to the deepest point of the other notch. To form a load anchor the anchor plate is used with a second anchor plate which is identical in construction, with the deeper notch in the first anchor plate being juxtaposed to the shallower notch in the second anchor plate, and the shallower notch in the first anchor plate being juxtaposed to the deeper notch in the second anchor plate. The head portion of both plates extends through an opening in the track to secure a load to the track; however, the apertures in the anchor plates are not in registry when the deepest point in the deeper notch in each plate is in registry with the deepest point of the shallower notch in the other plate. Inasmuch, the plates can be moved with respect to one another in the opening in the track a distance about equal to the depth of the shallower notch plus the difference between the length of the opening in the track and the distance between the deepest point of the deeper notch and the opposite end of the head, the apertures in the anchor plates can thus be placed in registry to enable the strap to snugly fit therethrough. When the apertures are in registry and locked in position by having the strap snugly positioned therethrough, the deepest points of the notches are not in registry but the end portions of the head portion adjacent the notches abut the track and prevent removal of the load anchor. When the strap is pulled out of the load anchor, the plates can be removed merely by manipulating each anchor plate individually; preferably in one plane.

In the preferred embodiment, one notch is twice the depth of the other notch, and the geographic center of the aperture is equidistant from both transverse edges of the anchor plate. Additionally, the distance between the deepest point of the shallower notch and the opposite end of the head portion exceeds the length of the opening in the track; and the distance between the deepest point of the deeper notch and the opposite end of the head portion is less than the length of the opening in the track.

A further feature provides a flange which protrudes from each anchor plate at one end of the base portion, usually in a direction substantially normal to the plane of the anchor plate. The flange of one anchor plate is positioned opposite to the flange of the other anchor plate such that the apertures in both anchor plates are in registry when both anchor plates are inserted in an opening in the track and are in the position where the flange on one anchor plate is in contact with the opposite end of the base portion of the other anchor plate. The flanges limit movement of the anchor plates with respect to one another and facilitate positioning of the apertures in registry with one another.

BRIEF DESCRIPTION OF THE DRAWINGS

FIG. 3 is a fragmentary elevational view of a track accommodating a load anchor of this invention;

FIG. 4 is a perspective view on an enlarged scale of an anchor plate of the load anchor shown in FIG. 1;

FIG. 5 is an elevational view, partly in section, of a load anchor of the present invention when resting in a track but not anchoring; and FIG. 6 is a view similar to FIG. 5 showing the load anchor in a configuration assumed when anchoring, i.e., with the anchor plate apertures in registry and the strap extending therethrough.

DESCRIPTION OF THE PREFERRED EMBODIMENTS

Figure 1:
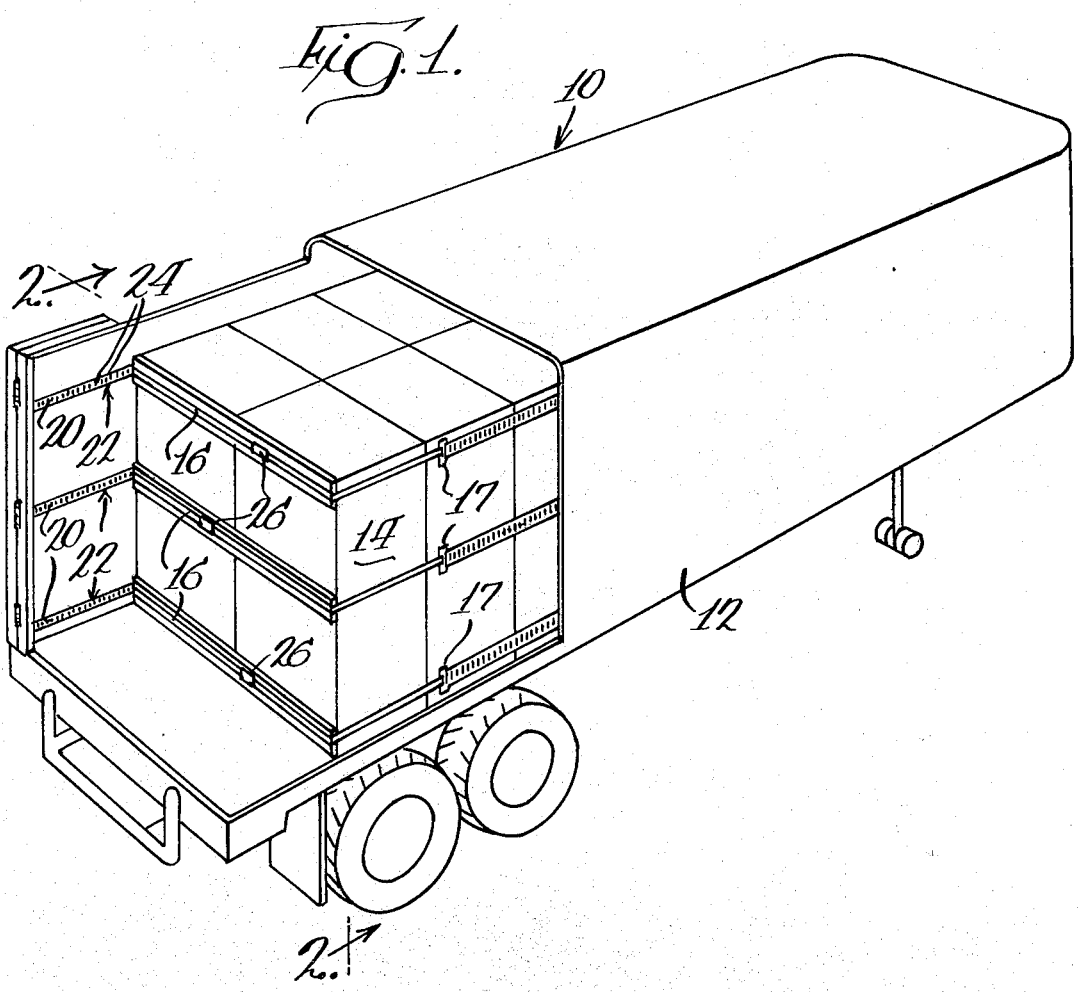
FIG. 1 is a perspective view, partly broken away, of a tractor trailer provided with the load anchor of the present invention.
Figure 2:
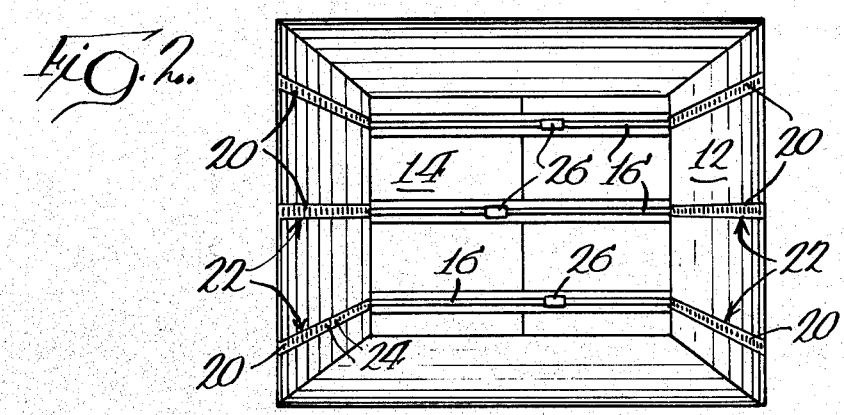
FIG. 2 is a perspective view taken at plane 2—2 in FIG. 1.

Referring first to FIGS. 1 and 2, there is shown metal trailer 10 having sidewalls 12. Shown located therein is load 14, retained in position by tensioned straps 16. One end of each of the straps that are tensioned and sealed to retain load 14 in position is anchored by load anchor 17 of the present invention. Load anchor 17 is designed to be releasably connected to flat, horizontally disposed central flange 20 of longitudinally extending tracks 22 which flange extends substantially parallel to sidewalls 12. Mounting flanges 21 of tracks 22 extend along sidewall 12 and are welded or otherwise secured thereto. Load anchor 17 extends through spaced openings 24, illustrated in FIG. 3, and retains the straps fixed relative to tracks 22. More particularly, as shown in FIGS. 5 and 6, the load anchor 17 comprising a pair of anchor plates 18 and 19 extends through spaced openings 24 in a flat mid-portion or central flange 20 of track 22. The load anchor of the present invention comprises a pair of rigid metal anchor plates having a configuration as described below. Other rigid materials may also be suitable.

Strap 16, utilized to retain load 14 in position, is threaded through a pair of anchor plates 18 and 19 on each track 22 as shown in FIG. 6. Straps 16 are then tensioned to secure load 14 in position and overlapped portions of straps 16 are retained in position by crimped seals 26 (FIG. 2).

Referring now specifically to FIG. 4, anchor plate 19 is a rigid plate having a pair of lateral edges 28 and 30, and a pair of transverse edges 32 and 34. Transverse edges 32 and 34 have respective notches 36 and 38 which define neck portion 40 separating head portion 42 and base portion 44. Notch 38 is deeper than notch 36.

The distance between the deepest point 100 of deeper notch 38 and the opposite end 32 of the head portion 42, is less than the length of opening 24 in track 22 so that the head portion of the anchor plate can be inserted in opening 24. The depth of the shallower notch 36, plus the difference in length between the length of opening 24, and the distance between deepest point 100 of the longer notch 38 and the opposite end 32 of head portion 42, is thus the distance which the anchor plate 19 can be displaced while inserted in opening 24 in track 22.

Aperture 46 is provided in the midsection of base portion 44 of anchor plate 19. Aperture 46 is adapted to receive a strap and may be oblong, cylindrical, or some other shape to enable a strap to snugly extend therethrough. Similarly, aperture 47 is provided in the midsection of base portion 45 of anchor plate 18. The anchor plates may have more than one aperture, if desired.

In FIG. 4 anchor plate 19 is arranged such that the distance between the geographic center point 102 of aperture 46 to deepest point 104 of shallower notch 36 is greater than the distance between point 102 to the deepest point 100 of deeper notch 38. As illustrated in FIGS. 5 and 6, anchor plate 19 is used in conjunction with a second anchor plate 18 which may be identical in construction, and the asymmetrical relationship between the respective geographic center points 102 and 103 of apertures 46 and 47 and the deepest points 104, 100; 105, 101 of respective notches 36, 38; 37, 39 in both plates enables anchor plates 18 and 19 of the present invention to work in conjunction with one another to maintain the load anchor securely attached to track 22 when a strap is threaded through apertures 46 and 47 because head portions 42 and 43 both are retained by central flange 20.

In the preferred embodiment of this invention, deeper notch 38 is twice the depth of shallower notch 36, and aperture 46 is equidistant from transverse edges 32 and 34. Opening 24 in track 22 has a length greater than the distance between the deepest point 100 of deeper notch 38 and transverse edge 32, and less than the distance between the deepest point 104 of shallower notch 36 and transverse edge 34, so that each anchor plate when inserted, can be displaced with respect to the other anchor plate to align respective apertures 46 and 47; and both ends of each anchor plate, adjacent the notches, abut the track to prevent rotational movement of the anchor plates and prevent removal of the load anchor. Geographic center point 102 of aperture 46 is in a plane 3—3 which is perpendicular to lateral edges 28 and 30 and perpendicular to a line passing through deepest points 104 and 100 of notches 36 and 38. The depth of notches 36 and 38, and the position of aperture 46 may be varied, so long as the distance between deepest point 104 of shallower notch 36 and plane 3—3 is less than or equal to half the length of opening 24 in track 22, and greater than the difference in length between the length of opening 24 in track 22, and the distance between transverse edge 34 and plane 3—3 which passes through geographic center point 102 of aperture 46. Thus, notches 38 and 36 may have depths in the ratios of 3:1 or 4:1 or the like; however, the ratio of 2:1 is preferred because contact between the load anchor and the wall of track 22 is maximized when strap 16 is inserted through the apertures.

As illustrated in FIG. 4, anchor plate 19 may be provided with a flange 70 which protrudes from the plate at the end of base portion 44 having the relatively deeper notch 38. FIGS. 5 and 6 depict the interrelationship between anchor plates 19 and 18 of the present invention which may be identical in construction and have respective flanges 70 and 72. Before the strap 16 is extended therethrough, anchor plates 18 and 19 are inserted in an opening in track 22 so that the head portions 42 and 43 of both anchor plates extend through the opening. Both anchor plates must be inserted into the same opening in the track. Anchor plates 18 and 19 are inserted into the track opening so that flange 72 on anchor plate 18 is adjacent to the end of anchor plate 19 which end does not have a flange, and flange 70 on anchor plate 19 is adjacent to the end of anchor plate 18 which end does not have a flange. As a result, deeper notch 38 on anchor plate 19 is positioned adjacent to shallower notch 37 on anchor plate 18, and shallower notch 36 on anchor plate 19 is positioned adjacent to deeper notch 39 on anchor plate 18.

As shown in FIG. 5, when the deepest points of adjacent notches in the anchor plates are in registry, apertures 46 and 47 are not aligned. In order to insert strap 16 through apertures 46 and 47 in load anchors 19 and 18, the anchor plates can be moved with respect to one another from the configuration illustrated in FIG. 5 to the configuration illustrated in FIG. 6, wherein the deepest points of the notches 36, 37, 38, 39 are not in registry but the apertures 46 and 47 are in registry such that strap 16 extends snugly therethrough. When the apertures are in registry, notch 37 in anchor plate 18 and notch 36 in anchor plate 19 are arranged so that the corresponding head portion of each load anchor abuts track 22 adjacent to the opening in track 22, thereby preventing removal of the load anchors. The flanges are positioned such that flange 72 on load anchor 18 abuts the opposite transverse edge 32 of load anchor 19, and flange 70 on load anchor 19 abuts the opposite transverse edge 33 of load anchor 18. The flanges limit movement of the load anchors with respect to one another to align the apertures for easy insertion of the strap.

As illustrated in FIG. 4, the head portion 42 of load anchor 19 may be tapered along lateral edge 28 adjacent to transverse edges 32 and 34 to provide for an easier insertion of the load anchor into an opening in the track. The wall of notches 36 and 38 formed by base portion 44 of the load anchor 19 may also be tapered, resulting in an increased width of notches 36 and 38 away from deepest points 104 and 100, to thereby provide for an easier insertion of anchor plate 19 into an opening in the track. As illustrated in FIGS. 4 and 5, the wall of notches 36 and 38 formed by head portion 42 of load anchor 19 is preferably parallel to the flat mid-portion of track 22.

As illustrated in FIGS. 5 and 6, preferably apertures 46 and 47 are positioned in the base portion of load anchor 17 so that the apertures lie on the base portion side of a plane 4—4 which passes along the outside surface 74 on the mid-portion or flange 20 of track 22. It is recognized, however, that track 22 may have a configuration whereby it would be possible to have apertures 46 and 47 positioned in the neck portion of the head portion of the anchor plates.

While the invention has been illustrated by showing a load secured to the wall of a tractor trailer, it is, of course readily apparent that the novel device disclosed herein can be used wherever it is necessary to secure a load in position relative to a stationary bulkhead.

The foregoing specification and the drawings are intended as illustrative and are not to be taken as limiting. Still other variations and re-arrangements of parts are possible without departing from the spirit and scope of the present invention.

I claim:

1. A load anchor means for securing a strap to a fixed track having a plurality of openings adapted to receive said load anchor means which comprises a pair of elongated, asymmetric, substantially rigid anchor plates juxtaposed relative to one another, each anchor plate being defined by a pair of transverse edges and a pair of lateral edges, each transverse edge being provided with a notch for engaging said track and both notches together delineating a head portion receivable in said opening and a base portion; the base portion being provided with an aperture for receiving said strap, both of said anchor plates being receivable in said openings in said track and movable relative to one another to position said anchor plates with said apertures in registry with one another, whereby said head portions of both anchor plates engage said track to retain said load anchor means in said track.

2. An anchor means as described in claim 1 wherein said aperture is equidistant from both transverse edges, and wherein one of said notches is twice as deep as the other notch.

3. An anchor means as described in claim 1, wherein one end of said base portion of each anchor plate has a flange protruding from the plane of said anchor plate, said flange being positioned so that the apertures in both anchor plates are in registry when said head portion of each anchor plate extends through an opening in said track and said flange on each anchor plate abuts the base portion of the other anchor plate.

4. An anchor means as described in claim 3 wherein said flange is at the end of said base portion having said deeper notch.

5. A load anchor means as described in claim 1, wherein said aperture is oblong.

6. An anchor means for securing a strap in a track having a plurality of spaced oblong openings, said anchor means comprising a pair of rigid anchor plates, each anchor plate having a pair of lateral and transverse edges, each transverse edge having a notch therein which defines a neck portion separating a head portion and a base portion, one of said notches being deeper than the other notch; the distance between the deepest point of said other notch and the opposite transverse edge of said head portion being greater than the longitudinal dimension of said oblong openings in said track, the distance between the deepest point of said deeper notch and the opposite transverse edge of said head portion being less than the longitudinal dimension of said oblong opening, said base portion having a central aperture and the distance between the geographic center of said aperture and the deepest point of said deeper notch being less than the distance between the geographic center of said aperture and the deepest point of said other notch; said anchor plates being receivable in at least one of said oblong openings in said track and movable with respect to one another when in said openings so that said head portions of both anchor plates engage said track and prevent removal of said anchor plates when said apertures in both anchor plates are shifted in registry with one another to receive said strap therethrough.

7. An anchor means as described in claim 6 wherein said geographic center of said aperture in each anchor plate is in a plane perpendicular to a line passing through said deepest points of said notches; and the distance between said deepest point of said other notch and said plane is less than onehalf the longitudinal dimension of said opening in said track, and is greater than the difference in length between the longitudinal dimension of said opening in said track and the distance between said transverse edge adjacent said deeper notch and said plane.

8. An anchor means as described in claim 6 wherein said geographic center of said aperture is equidistant from both transverse edges, and said deeper notch is twice the depth of said other notch.

9. An anchor means as described in claim 6, wherein one end of said base portion of each anchor plate has a protruding flange substantially normal to the plane of said anchor plate; said flange being positioned so that the apertures in both anchor plates are in registry when said head portion of each anchor plate extends through an opening in said track and said flange on each anchor plate abuts the base portion of the other anchor plate.

10. An anchor means as described in claim 9 wherein said flange is at the end of said base portion having said deeper notch.

11. An anchor means as described in claim 6, wherein both anchor plates are receivable in one opening in said track.

12. An anchor means as described in claim 6, wherein said openings in said track are in a flat mid-portion of the track and each said notch is defined by a wall on said head portion; said wall being substantially parallel to said flat mid-portion in said track when said anchor means is positioned on said track.

13. An anchor means as described in claim 6, wherein said aperture is positioned in the base portion.

14. An anchor means as described in claim 6, wherein said aperture is rectangular.

15. An anchor means as described in claim 6, wherein said aperture is round.

* * * * *